US010126593B2

(12) United States Patent
Zhang et al.

(10) Patent No.: US 10,126,593 B2
(45) Date of Patent: Nov. 13, 2018

(54) DISPLAY MODULE AND INSTALLATION METHOD OF THE SAME (71) Applicant: KEEWIN DISPLAY CO.,LTD., Shanghai (CN)

(72) Inventors: Qianzhong Zhang, Shanghai (CN); Rubin Sun, Shanghai (CN); Rongjun Gu, Shanghai (CN)

(73) Assignee: Keewin Display Co., Ltd., Shanghai (CN)

(*) Notice: Subject to any disclaimer, the term of this patent is extended or adjusted under 35 U.S.C. 154(b) by 0 days.

(21) Appl. No.: 15/112,061

(22) PCT Filed: Jul. 14, 2014

(86) PCT No.: PCT/CN2014/082133
§ 371 (c)(1),
(2) Date: Jul. 15, 2016

(87) PCT Pub. No.: WO2015/192419
PCT Pub. Date: Dec. 23, 2015

(65) Prior Publication Data
US 2016/0320667 A1 Nov. 3, 2016

(30) Foreign Application Priority Data

Jun. 18, 2014 (CN) .......................... 2014 1 0273054

(51) Int. Cl.
G02F 1/1335 (2006.01)
G02F 1/1333 (2006.01)

(52) U.S. Cl.
CPC .. *G02F 1/133602* (2013.01); *G02F 1/133308* (2013.01); *G02F 1/133385* (2013.01);
(Continued)

(58) Field of Classification Search
CPC ......... G02F 1/133308; G02F 1/133608; G02F 2001/133628; G02F 2001/133314; G02F 2001/133317; G02F 2001/133322
See application file for complete search history.

(56) References Cited

U.S. PATENT DOCUMENTS 6,580,477 B1 * 6/2003 Cho ..................... G02B 6/0046
349/58
8,220,981 B2 * 7/2012 Bae ..................... G02B 6/0021
349/61

(Continued)

FOREIGN PATENT DOCUMENTS

CN 201652046 U * 11/2010

OTHER PUBLICATIONS

Machine translation of CN 201652046U to Li, Haibin, published Nov. 24, 2010.*

Primary Examiner — William N Harris
(74) Attorney, Agent, or Firm — Wang Law Firm, Inc.

(57) ABSTRACT

A display module has therein a light board, an installation frame and multiple function plate securely received inside the installation frame. The installation frame is composed of multiple installation strips interconnected together and each one of the installation strips is provided with an installation device through which the function plate is secured inside the installation frame. The light board is detachably mounted on an installation face of the installation frame.

14 Claims, 9 Drawing Sheets (52) U.S. Cl.
CPC ............ *G02F 2001/133325* (2013.01); *G02F 2001/133328* (2013.01); *G02F 2001/133628* (2013.01)

(56) References Cited

U.S. PATENT DOCUMENTS

| | | | | |
|---|---|---|---|---|
| 9,239,154 | B2* | 1/2016 | Zeng | F21V 21/00 |
| 9,696,601 | B2* | 7/2017 | Hong | G02F 1/13452 |
| 9,726,920 | B2* | 8/2017 | Bae | G02B 6/0088 |
| 9,766,488 | B2* | 9/2017 | Nishi | G02F 1/133308 |
| 2005/0248939 | A1* | 11/2005 | Li | G02F 1/133604 |
| | | | | 362/225 |
| 2008/0285277 | A1* | 11/2008 | Chang | G02F 1/133608 |
| | | | | 362/247 |
| 2010/0321421 | A1* | 12/2010 | Kee | G09G 3/3426 |
| | | | | 345/697 |
| 2013/0100699 | A1* | 4/2013 | Chen | G02F 1/133615 |
| | | | | 362/611 |
| 2015/0277179 | A1* | 10/2015 | Nishi | G02B 6/0088 |
| | | | | 349/58 |

* cited by examiner

Fig. 1

Prior Art

DISPLAY MODULE AND INSTALLATION METHOD OF THE SAME

FIELD OF THE INVENTION

The invention is related to the technology of display, and more particularly, to a display module as well as the method of installation of the display module.

BACKGROUND

There are two types of LCD display constructions, i.e., cell and open cell during the manufacture process of a display module. In the cell structure, liquid crystal is filled in the gap between two substrates and then the two substrates are sealed to form a module, whose appearance is the same as a normal piece of glass. After the prior process is completed, connection ports are provided to a cell-based display module for external signal, i.e., open-cell. However, a backlight module is not included in the display module so made.

A display module cannot illuminate by itself but through the backlight module. As a result, the backlight module is crucial in the display industry. The backlight module is composed of a light source, a light guide, an optical membrane, a rubber strip and a backboard. The illumination efficiency is dependent from the matrix arrangement between the backboard structure and the light source. Therefore, it is an issue to be solved in the design of backlight module to make it light-weight, thin, high luminosity and low cost.

Figure 1:
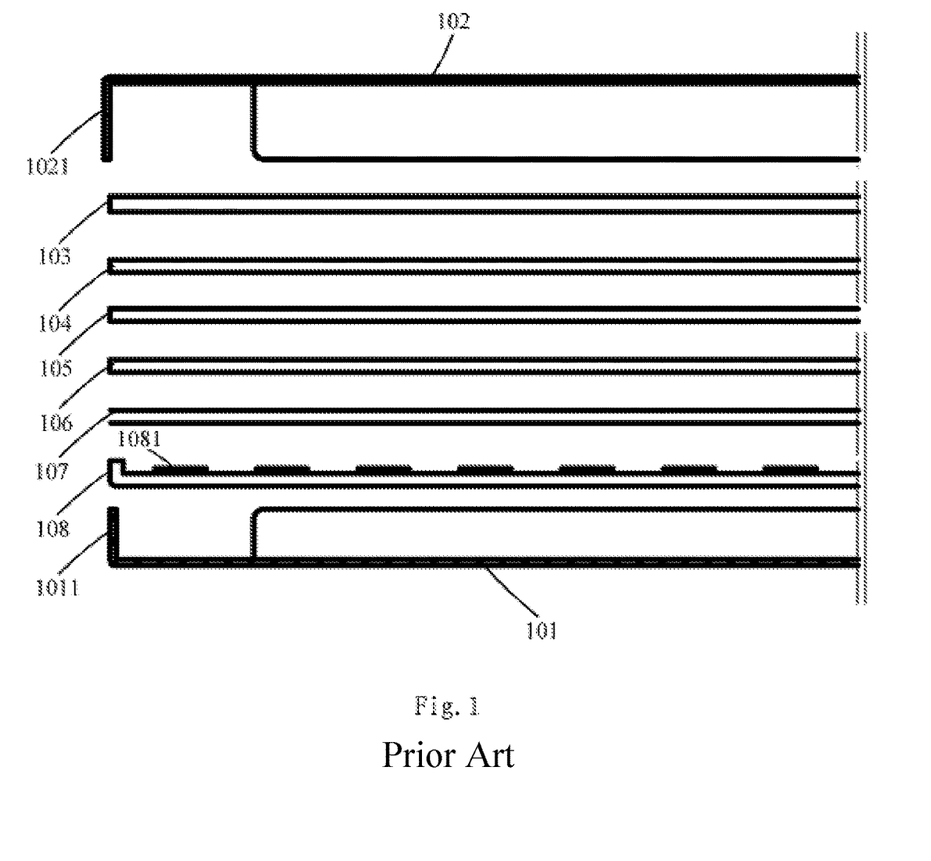
FIG. 1 is an exploded plan view showing a conventional display module of the art.

In the existing backlight modules, most of the backlight modules are integrally formed. A backlight module, as shown in FIG. 1, has a liquid crystal plate 103, prism plates 104, 105, a diffusion plate 106, a reflection plate 107 and an LED board 108, all of which are sandwiched between a backboard 101 and a front frame 102. Side faces 1011 of the backboard 101 and side faces 1021 of the front frame 102 are sealingly combined such that the backboard 101 and the front frame 102 together form a sealed space. A rubber strip is provided to the side face 1011 of the backboard 101 and the side faces 1021 of the front frame 102 so that the liquid crystal plate 103, the prism plates 104, 105, the diffusion plate 106, the reflection plate 107 and the LED board 108 are firmly sandwiched between the front frame 102 and the backboard 101. Numerous light sources 1081 are mounted on top of the LED board 108, which allows light coming from the light sources 1081 to penetrate through the reflection plate 107, the diffusion plate 106, the prism plates 104, 105 as well as the liquid crystal plate 103 and eventually leave the front frame 102. As the front frame 102 and the backboard 101 are made of metal to gain the best heat dissipation effect, however, dismantling the combination of the backboard 101 and the front frame 102 for maintenance and repair is difficult and troublesome when there is malfunction happened to one or some of the light sources 1081.

Normally, there are some choices available for the metal for the backboard 101 and the front frame 102:

Aluminum: good for heat dissipation but bad for cost consideration;

Iron: iron is used for the backboard and an aluminum strip is provided to the side face for the light source for heat dissipation. This kind of design is bad for overall heat dissipation and increases the total weight of the backlight module, which is bad for the goal of lightweight.

In a Chinese patent CN202132887U, a design for backlight module is disclosed, numerous aluminum strips are provided to locations corresponding to places where the light sources are mounted and then iron is used for other portions, which ensures that the heat dissipation effect is good and the overall manufacture cost for the backlight module is low.

All the above statement uses an integral design for the backlight module. Nowadays, due to different requirements from the customers for different sizes of the displays, a large quantity of displays of different sizes are made to fulfill the requirements. However, in order to fulfill the requirements, manufacturers need to invest a lot of hardware such as production lines for different sizes of the displays, manpower and above all, a lot of money, which is not very good for budge control.

SUMMARY OF THE INVENTION

The primary objective of the embodiment(s) provided for the present invention is to overcome deficiencies in the current technology and provide a multi-function display module and the installation method of the same to solve the problem of high cost in the manufacture process.

The technology used in the embodiment of the present invention includes the following details.

The display module manufactured by the embodiment of the present invention includes multiple function plates and an installation frame. The installation frame is composed of multiple installation strips interactively connected together and provided with installation devices so that the function plates are installed inside the installation frame.

The adoption of installation strips for the installation frame saves the cost for integral backboard, front frame and rubber strips. In addition, the installation strips can be commonly used for all sizes. That is, no more production lines for different display sizes are needed, which greatly reduces manufacture cost and beneficial for the manufacturer to control the overall budget, let alone easy maneuver and strong adaption for display sizes.

Another objective of the embodiment of the present invention is that the installation frame is composed of four or more installation strips. Each free end of every one of the installation strips is interactively connected to one another to form the installation frame.

Still, another objective of the embodiment of the present invention includes a light board detachably mounted on the installation frame to facilitate dismantle for easy repair and/or maintenance.

Another objective of the embodiment of the present invention is that the light board is composed of a plurality of light units interactively connected together and detachably provided on the installation face of the installation frame, which facilitates the repair and/or maintenance to an individual light unit.

Still another objective of the embodiment of the present invention is that a connection portion, optionally, a curved one, is provided to one distal end of each of the plurality of light units for connection to an adjacent light unit.

A further objective of the embodiment of the present invention is that the light board includes a base which is made of a material efficient for heat dissipation.

A further objective of the preferred embodiment of the present invention is that an installation recess defined in an inner face of the installation frame is provided for the function plate.

A further objective of the embodiment of the present invention is that the function plate at least includes a LCD display fitted by way of a pressing element to be secured inside an installation face formed on the installation frame.

Still, a further objective of the preferred embodiment of the present invention is that a heat dissipation device is provided to each of the installation strips.

Still, another objective of the preferred embodiment of the present invention is to provide a method for installing a display module, which includes the steps of:

providing function plates;

providing installation strips respectively having an installation device on one side of each of the installation strips; and connecting the installation strips to form an installation frame and installing the function plate inside the installation frame through the installation devices.

Connecting the installation strips to form the installation frame so that the function plate is able to be mounted inside the installation frame saves the material for, such as, the backboard as well as the front frame. Furthermore, because the only thing required is to cut the installation strips into segments of different sizes/lengths to fit the requirements of different display sizes, installation strips can be commonly used so that there is no need to design various molds to manufacture displays of different sizes, which helps reduce production cost, beneficial for manufacturers to control overall budget and easy adaption for requirements of size.

Another objective of the embodiment of the present invention is that the installation frame is composed of four or more installation strips. Each free end of every one of the installation strips is interactively connected to one another to form the installation frame.

Still, another objective of the embodiment of the present invention includes a light board detachably mounted on the installation frame to facilitate dismantle for easy repair and/or maintenance.

Another objective of the embodiment of the present invention is that the light board is composed of a plurality of light units interactively connected together and detachably provided on the installation face of the installation frame, which facilitates the repair and/or maintenance to an individual light unit.

Still another objective of the embodiment of the present invention is that a connection portion, optionally, a curved one, is provided to one distal end of each of the plurality of light units for connection to an adjacent light unit.

A further objective of the embodiment of the present invention is that the light board includes a base which is made of a material efficient for heat dissipation.

A further objective of the preferred embodiment of the present invention is that an installation recess defined in an inner face of the installation frame is provided for the function plate.

A further objective of the embodiment of the present invention is that the function plate at least includes a LCD display fitted by way of a pressing element to be secured inside an installation face formed on the installation frame.

Still, a further objective of the preferred embodiment of the present invention is that a heat dissipation device is provided to each of the installation strips.

DETAILED DESCRIPTION OF THE PREFERRED EMBODIMENT

In combination of the accompanying drawings, the following description details the preferred embodiment(s) of the display module of the present invention.

Figure 14:
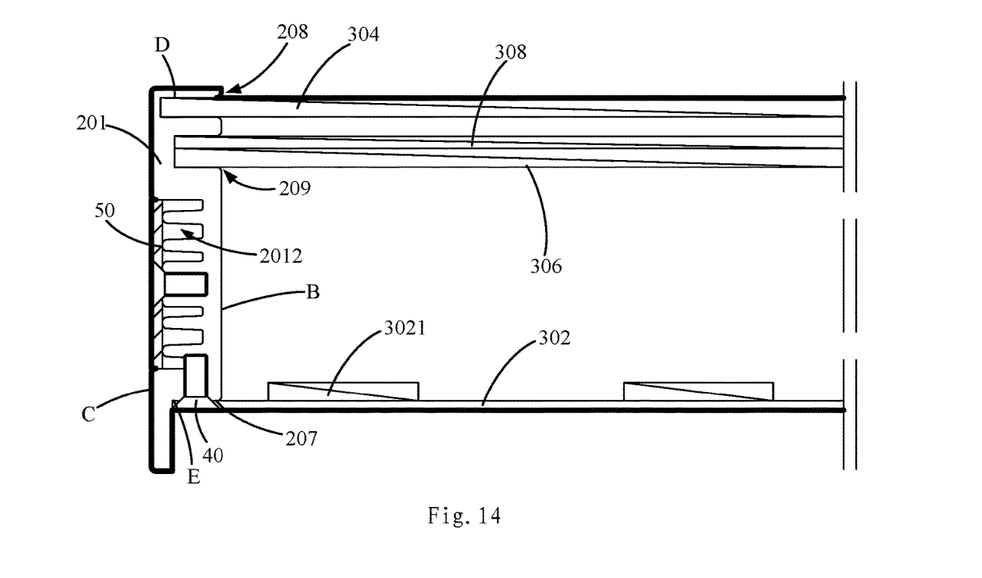
FIG. 14 is a schematic side plan view showing the first preferred embodiment of the display module of the present invention.

In order to facilitate description and understanding, as shown in FIG. 14, four sides marked with the letter B of the installation frame are defined as inner sides, four sides in contrast to inner sides and marked with the letter C are outer sides, an end marked with the letter D of the installation frame in connection with the LCD panel (open cell) is defined as the first end and an end marked with the letter E of the installation frame in connection with the light board is defined as the second end.

Figure 2:
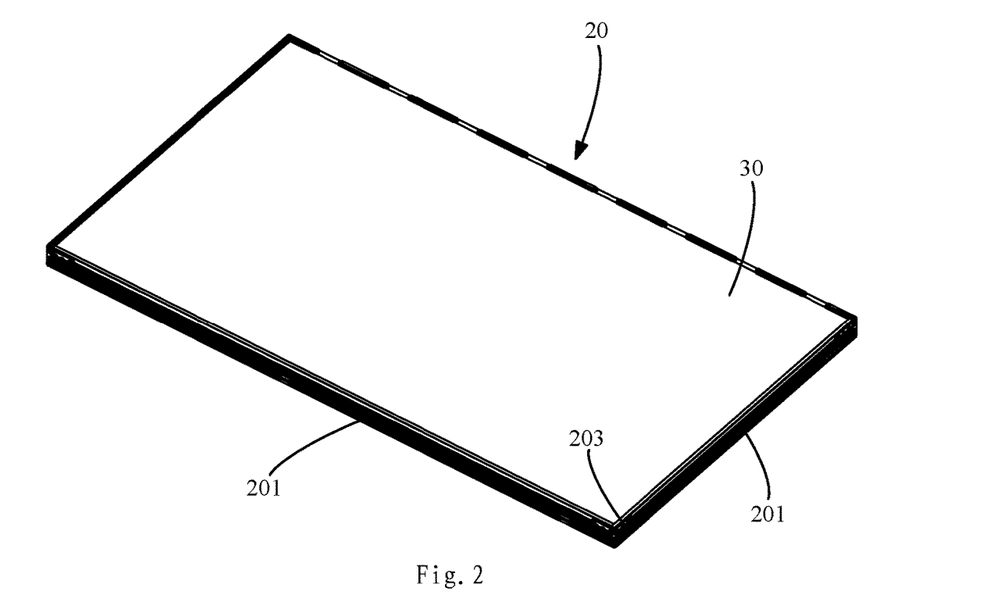
FIG. 2 is a schematic perspective view of the display module of the preferred embodiment of the present invention.

With reference to FIG. 2, a preferred embodiment of the display module of the present invention is shown. It is to be appreciated that the display module adopts the installation frame to fix, by way of installation devices, function plates inside the installation frame which is composed of multiple installation strips interactively connected together. In contrast to the current available technology used to assemble a display module, the preferred embodiment of the present invention saves the material for the integrated metal backboard as well as front frame, which greatly reduces manufacture cost let alone the trouble for preparation of different molds for backboards of different sizes.

Adopting the installation strips of the preferred embodiment of the present invention, the only thing, in the process of preparation for the installation frame, is to cut the installation strips into different lengths. As a result of this easy and simplified preparation, the manufacturers are able to effectively control manufacture cost and the adaption for different sizes of the display module is thus readily solved. In addition, the detachably mounted light board on the second end of the installation frame is relatively convenient for repair and/or replacement as it only requires the dismantle of the light board on the second end of the installation frame and no need to dismantle the entire display module, which leaves the function plates, the LCD panel, the optical membrane as well as the diffusion plate on the first end of the installation frame intact from the maintenance to the light board on the second end of the installation frame. Heat dissipation devices mounted on the installation frame ensures the safety of the use of the display module.

Figure 3:
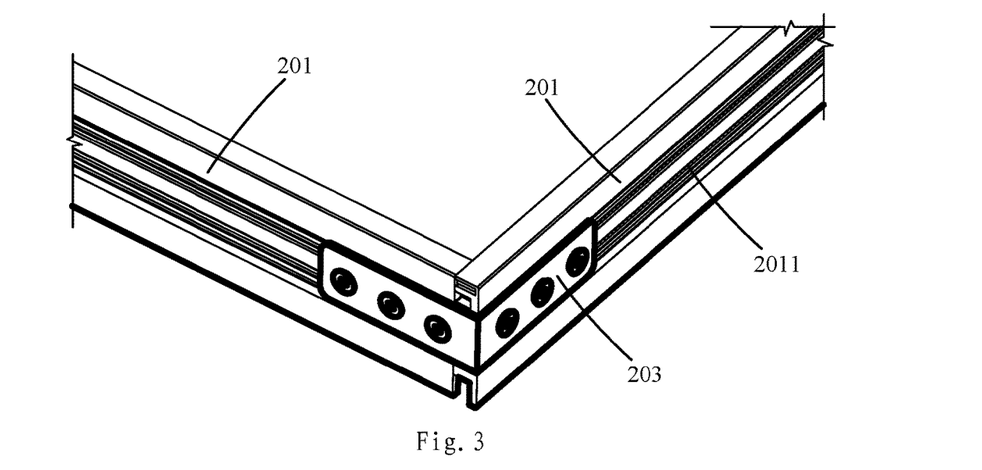
FIG. 3 is an enlarged perspective view of a portion of the display module of the preferred embodiment of the present invention.

With reference to FIG. 2, the display module constructed in accordance with the preferred embodiment of the present invention includes an installation frame 20 composed of multiple installation strips 201 interactively connected together and function plates 30 firmly mounted inside the installation frame 20 through installation devices 203, as shown in FIG. 3 which is an enlarged perspective view of a portion of the display module shown in FIG. 2. As shown in FIG. 3, it is appreciated that two distal ends of two respective installation strips 201 are mutually connected together by means of the installation device 203, which is an elongated strip like element. Optionally, the installation device 203 is bent to conform exterior appearance of the installation frame 20 so that when there is a curve or a right angle appeared on the installation frame 20, the installation device 203 can still satisfactorily combine the installation strips 201. Each of the installation strips 201 has a groove 2011 defined in an outside face of each of the installation strips 201 and having a depth adapted to a thickness of the installation device 203 such that after the installation devices 203 are respectively received in the grooves 2011 of the installation strips 201, the installation devices 203 do not protrude out of the grooves 2011, preferably, the top face of the installation devices 203 are flush with the top faces forming the grooves 2011. Preferably, the installation device 203 includes an elongated bar with holes defined in two distal ends thereof and bolts intended to extend through the holes of the elongated bar. When implemented, one distal end of the elongated bar is placed at a joint of two adjacent ends of two installation strips 201 and the bolts are threadingly extended through the holes of the elongated bar to secure the combination of the two installation strips 201.

Figure 4:
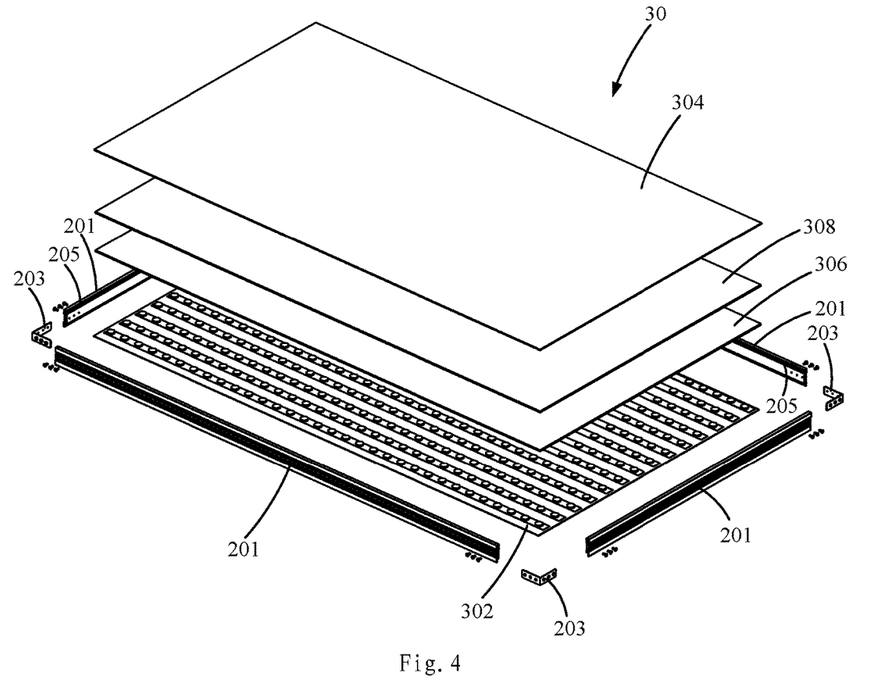
FIG. 4 is an exploded perspective view of the display module of the preferred embodiment of the present invention.
Figure 5:
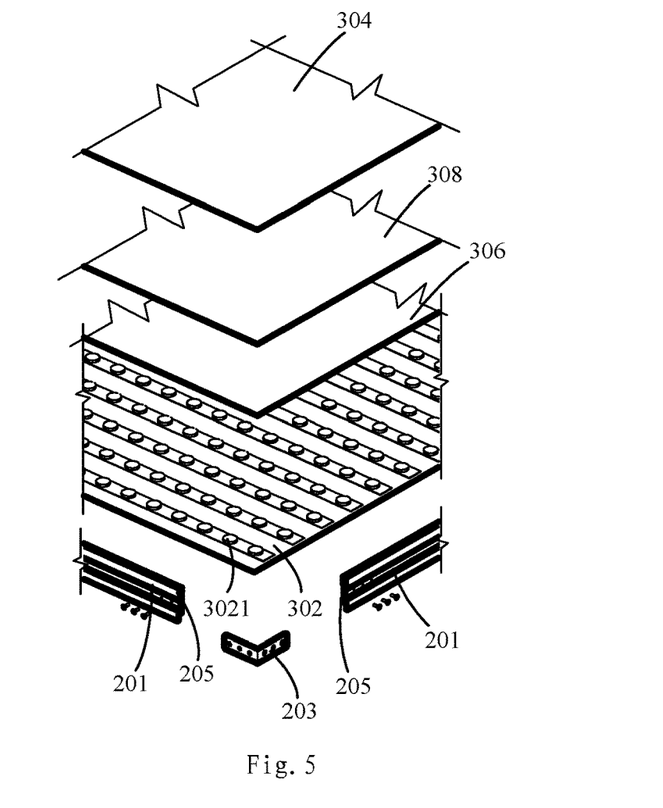
FIG. 5 is an enlarged perspective view of a portion of the display module of the preferred embodiment of the present invention shown in FIG. 4.

With reference to FIG. 4, an exploded perspective view of the display module of the preferred embodiment of the present invention is shown and FIG. 5 is an enlarged perspective view of a portion of the display module shown in FIG. 4.

In combination of FIGS. 4 and 5, it is appreciated that the installation frame 20 includes four installation strips 201 interactively connected together to form the installation frame 20 and two adjacent distal ends of two respective installation strips 201 are combined through the installation device 203. An installation groove 205 is integrally formed inside the installation frame 20 to secure the function plate 30 inside the installation frame 20 so that when the installation frame 20 is formed and the function plate 30 is about to be placed inside the installation frame 20, sides of the function plate 30 are able to be received in the installation groove 205 inside the installation frame 20.

Figure 10:
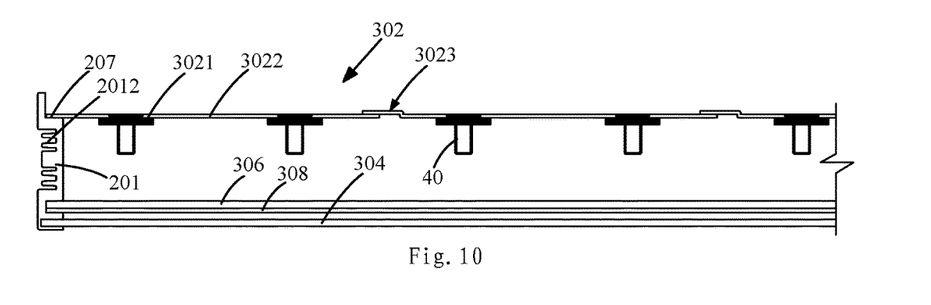
FIG. 10 is a side plan view of the display module of the preferred embodiment of the present invention.

In a preferred embodiment of the present invention, the function plate includes 30 at least a light board 302. With reference to FIG. 10, an installation face 207 near the light board 302 is formed on the installation frame 20 to allow the light board 302 to be detachably mounted thereon for quick access for maintenance and/or replacement of the light board 302.

Figure 6:
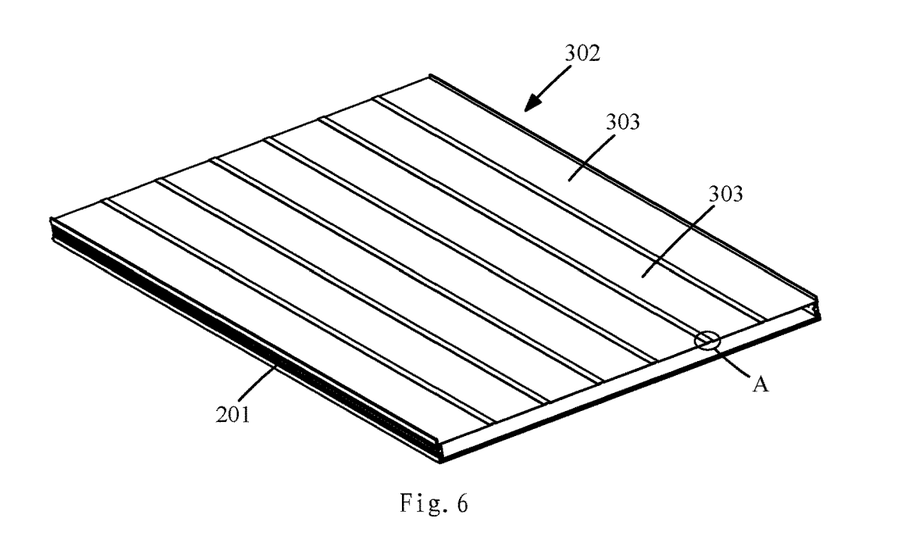
FIG. 6 is a top plan view of the back of the light board of the display module of the preferred embodiment of the present invention.

With reference to FIG. 6, the light board 302 includes a plurality of light units 303 detachably mounted on the installation face 207 of the installation frame 20. Preferably, the light units 303 are detachably mounted on the installation frame 20 through bolts.

Figure 7:
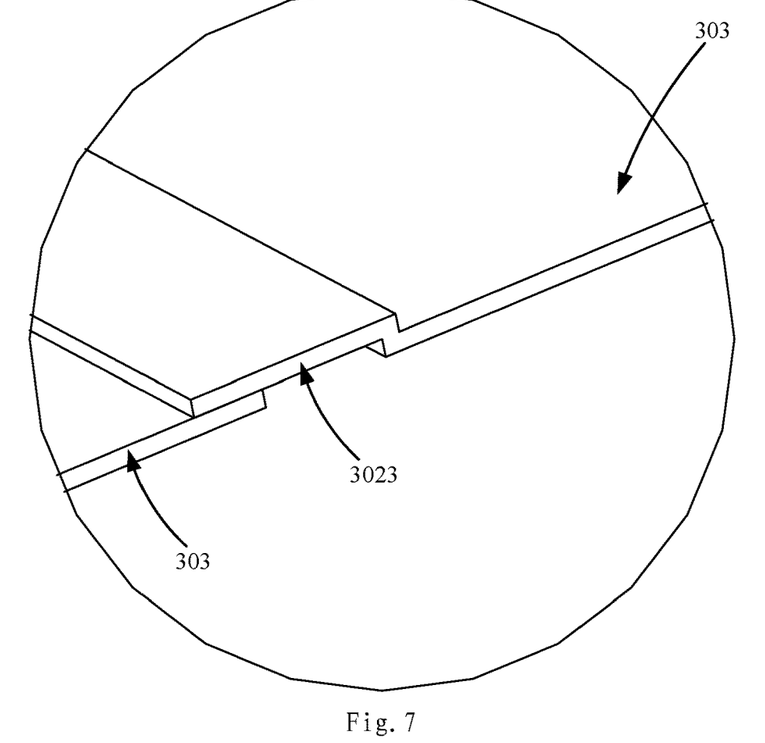
FIG. 7 is an enlarged perspective view of a portion marked A of the display module of the preferred embodiment of the present invention shown in FIG. 6.

With reference to FIG. 7, an enlarged perspective view of a portion of light board shown in FIG. 6 is shown. Each one of the light units 303 has a flat side and a stepped side 3023 oppositely formed relative to the flat side. When two light units 303 are connected together, the flat side of one light unit 303 is placed under the stepped side 3023 of another light unit 303 with a gap defined therebetween for easy access for dismantle. The provision of the stepped side 3023 of the light unit 303 secures the combination of two adjacent light units 303 and also prevent light from the light units 303 from scattering out from the back of the light units 303 and, therefore, enhances luminosity of the light units 303.

Figure 8:
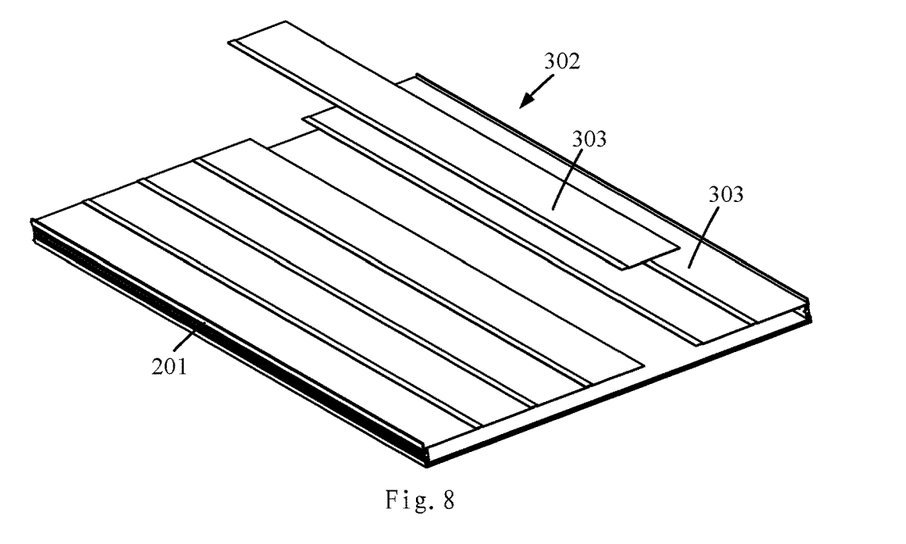
FIG. 8 is a schematic view showing the dismantle of the light board of the display module of the preferred embodiment of the present invention.

With reference to FIG. 8, when repair and/or replacement is required for the light units 303, dismantle is limited to only the malfunctioned one(s) and a massive scale of disassembly of the light units 303 is not necessary. When in process, it is preferably unscrewing the bolts and then using the gap between the stepped side 3023 of one light unit 303 and the flat side of an adjacent light unit 303 to separate the two adjacent light units 303 such that the user is able to proceed repairmen and/or replacement.

Figure 9:
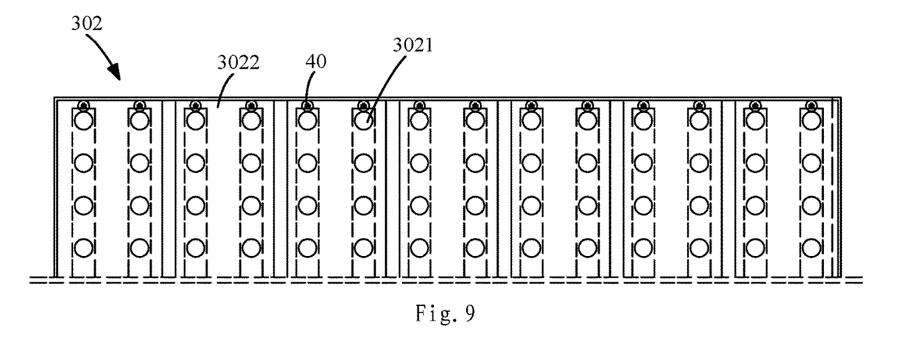
FIG. 9 is a front plan view of the light board of the display module of the preferred embodiment of the present invention.

With reference to FIG. 9, a front plan view of the display module of the preferred embodiment of the present invention is shown.

As shown in FIG. 9, the light board 302 includes a base 3022 and light sources 3021 mounted on the base 3022. The base 3022 is made of a heat dissipation material, such as, aluminum, to dissipate heat generated from the light sources 3021. The base 3022 is detachably mounted on the installation face 207 through bolts. In a preferred embodiment of the present invention, the base 3022 is composed of multiple strip like elements interactively connected together to form the base 3022 such that when light sources 3021 on one of the strip like elements of the base 3022 are out of order, i.e. broken and/or malfunctioned, maintenance to only the damaged one(s) is readily achieved.

Figure 11:
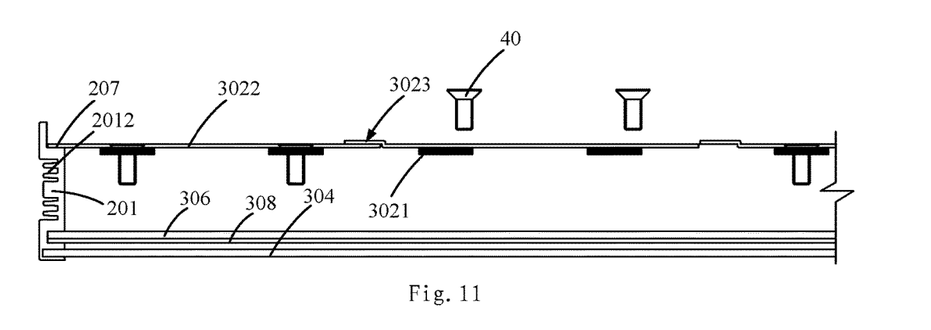
FIGS. 11 and 12 are schematic side plan views showing the dismantle of the light board of the display module of the preferred embodiment of the present invention.
Figure 12:
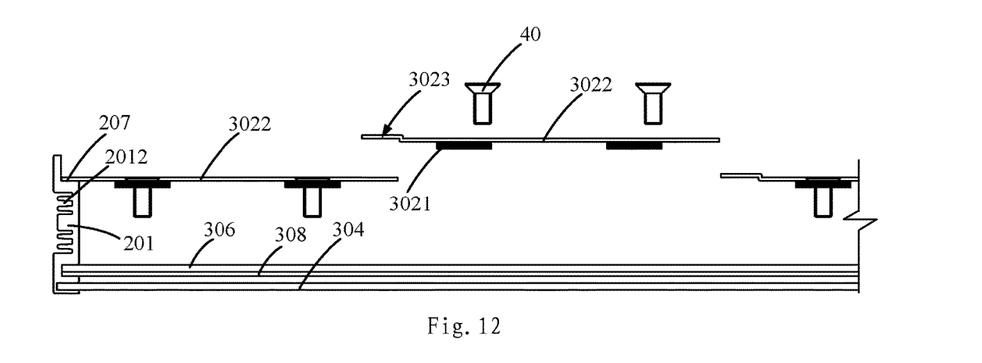

With reference to FIG. 10, a side plan view of the display module of the preferred embodiment of the present invention is shown. With reference to FIGS. 11 and 12, schematic views of dismantle of the display module of the preferred embodiment of the present invention are provided.

As shown in FIGS. 10 and 12, as the light board 302 includes the base 3022 composed of multiple strip-like elements and light sources 3021 mounted on each one of the strip-like elements which are mounted on the installation face 207 through bolts 40. As described earlier, each of the strip like elements of the base 3022 has a stepped side 3023 and a flat side, therefore, when in assembly, the flat side of one of the strip like elements of the base 3022 is placed under the stepped side 3023 of an adjacent one of the strip like element of the base 3022 with a gap defined between a free distal side of the flat side of the strip like element of the base 3022 and a wall forming the stepped side 3023 of the adjacent strip like element of the base 3022 for easy access for maintenance and/or repair. With the strip-like arrangement for the base 3022, when there is/are malfunctioned light source(s) on one of the strip-like elements of the base 3022, only the strip-like element having the malfunctioned light source 3021 thereon needs to be removed via the removal of the bolts 40.

Figure 13:
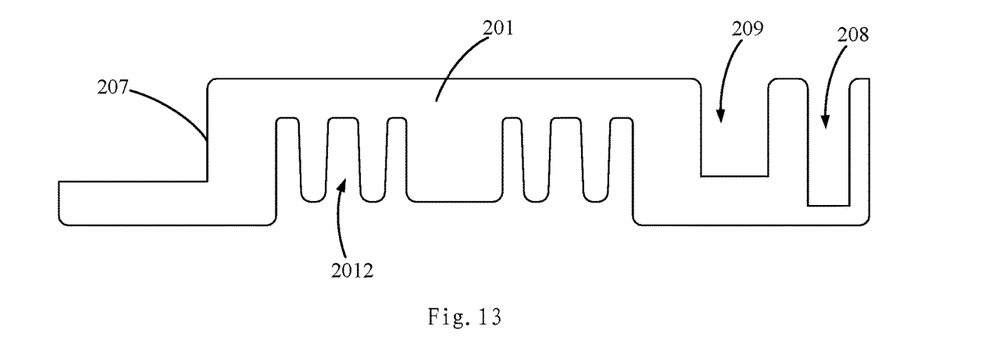
FIG. 13 is a schematic side plan view showing the first preferred embodiment of the installation strip constructed in accordance with the present invention.

With reference to FIGS. 13 and 14, one preferred embodiment of the installation strips is shown. Opposite to the distal end where the installation face 207 is formed, two continuous and adjacent first and second installation grooves 208, 209 are integrally defined in the installation frame 20 for receiving therein the function frame 30. The function frame 30 includes at least a LCD panel 304, a diffusion plate 306 and an optical membrane 308. The LCD panel 304 is inserted into the first installation groove 208 while the optical membrane 208 and the diffusion plate 306 are inserted into the second installation groove 209. Because the installation frame 20 is made of multiple installation strips 201, when the installation 20 is formed completely, the LDC panel 304, the optical membrane 308 and the diffusion plate 306 are properly and securely received in the first and second installation grooves 208, 209. Heat dissipation fins 2012 are formed on either an inner side or an outer side of the installation strips 201. When the heat dissipation fins 2012 are formed on the outer side of the installation strips 201, a cover 50 is provided to prevent pointed edges of the heat dissipation fins 2012 from being damaged or hurting people. The cover 50 may be snap fit to sides of the heat dissipation fins 2012 or secured on the installation frame 20 by way of bolts.

Figure 15:
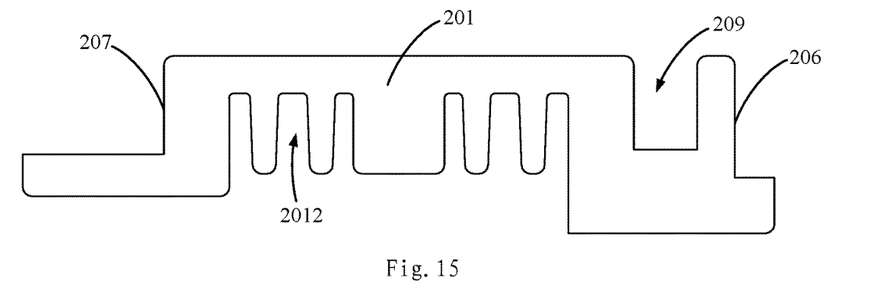
FIG. 15 is a schematic side plan view showing the second preferred embodiment of the installation strip constructed in accordance with the present invention.
Figure 16:
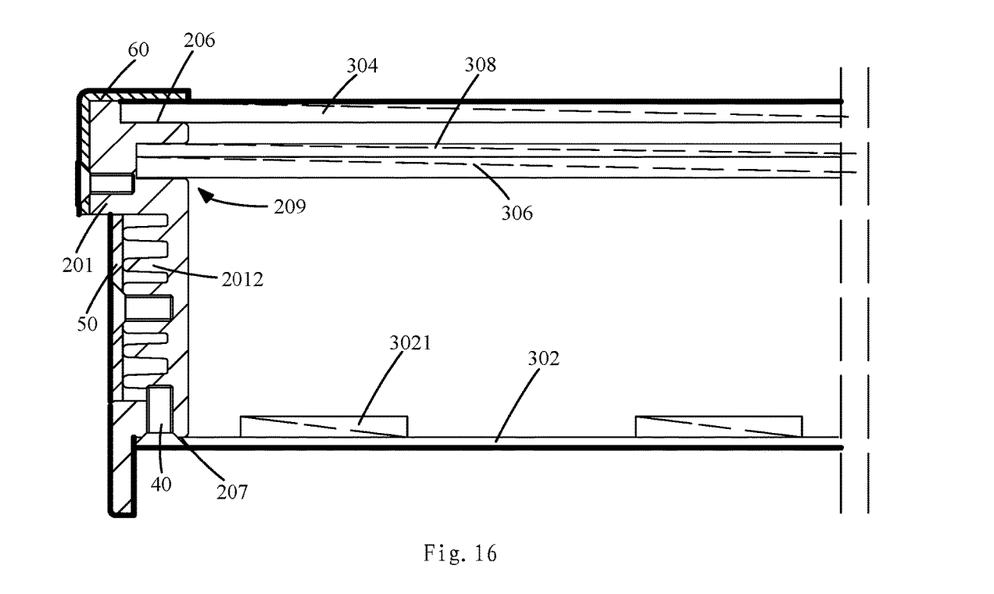
FIG. 16 is a schematic side plan view showing the second preferred embodiment of the display module of the present invention.

With reference to FIGS. 15 and 16, the second preferred embodiment of the installation strips constructed in accordance with the present invention is provided. In this embodiment, a second installation face 206 is formed on one side of the installation frame 20 for installation of the LCD panel 304. The LCD panel 304 is securely fixed on the installation face 206 through a fixing device 60. The fixing device 60 includes at least a pressing bar and bolts. After one side of the pressing bar securely abuts against one side of the LCD panel 304, bolt(s) are implemented to extend through the other side of the pressing bar and into the installation frame 20 to allow the LCD panel 304 to be securely fixed on the second installation face 206.

In still another preferred embodiment of the present invention, it is appreciated that the second installation face 206 and the second installation groove 209 are integrally formed on one side of each of the installation strips 201 and the installation face 207 is formed on the other side of each of the installation strips 201 for dismantling or installing the light board 302. In the preferred embodiment shown in the accompanying drawings, the light board 302 is detachably mounted on the installation face 207, while the optical membrane 308 and the diffusion plate 306 are inserted into the second installation groove 209. Also, the LCD panel 304 is fixed on the second installation face 206.

According to the above statement, it is noted that the advantages provided by the preferred embodiment of the present invention include:

Adopting the installation strips to form the installation frame saves the integral metallic backboard and front frame. In addition, the installation strips can be cut into any length to adapt to different size requirements, which enhances the maneuverability of operation. Therefore, the overall cost for production is reduced and the manufacturer(s) is able to control the cost efficiently.

The light board is detachably mounted on the installation frame so that maintenance and/or repair of the malfunctioned light sources on the light board is readily easy. In addition, the light board is composed of multiple strip like elements, which allows replacement to only the malfunctioned one(s) to be individually processed. The material used for making the light board is a heat dissipation material, which enhances the overall heat dissipation effect of the display module and protects the light source as well.

Heat dissipation fins 2012 are formed on one side of each of the installation strips to thus prolong the lifespan of the display module constructed in accordance with the preferred embodiment of the present invention.

Figure 17:
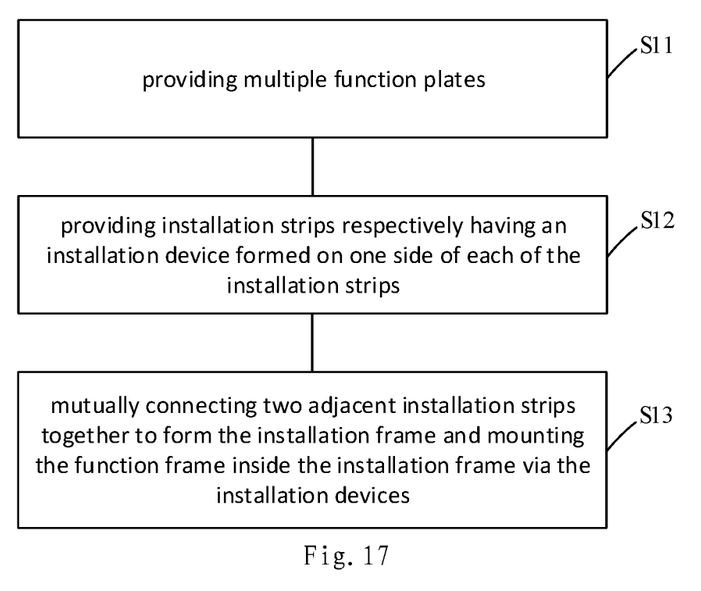
FIG. 17 is a flow chart showing the installation method used to assemble the preferred embodiment of the display module of the present invention.

With reference to FIG. 17, a flowchart showing steps of executing the installation of the preferred embodiment of the present invention is shown.

As shown in FIG. 17, a method of installation of the display module of the preferred embodiment of the present invention includes the steps of:

Step S11: providing multiple function plates; as shown in FIG. 2, multiple plates 30 are provided;

Step S12: providing installation strips respectively having an installation device formed on one side of each of the installation strips; as shown in FIG. 4, multiple installation strips 201 are provided and each of the installation strips 201 is provided with an installation device formed on one side of the installation strip 201;

Step S13: mutually connecting two adjacent installation strips together to form the installation frame and mounting the function frame inside the installation frame via the installation devices; with reference to FIGS. 2 and 4, it is appreciated that after the installation frame 20 is formed by interconnecting two adjacent installation strips together, the function frame 30 is fixed inside the installation frame 20 via the installation devices 203.

In a preferred embodiment of the present invention, as shown in FIG. 4, four installation strips 201 are provided and interconnected together to form the installation frame 20 and after the installation frame 20 is formed, the installation devices 203 are implemented to secure edges of the installation frame 20. Preferably, the installation device 203 includes an elongated bar with holes defined in two respective ends thereof and bolts intended to extend through the holes of the elongated bar and into the installation frame 20 so as to secure the edges of the installation frame 20.

In still another preferred embodiment of the present invention, with reference to FIG. 10, the function plate 30 includes at least a light board 302 detachably mounted on the installation face 207 of the installation frame 20 via bolts 40.

In another preferred embodiment of the present invention, the light board 302 is composed of multiple light units 303 respectively and detachably mounted on the installation face 207 of the installation frame 20 by means of bolts. Each of the light units 303 is provided with a stepped side 3023 and a flat side oppositely formed relative to the stepped side 3023. When forming the light board 302 is executed, the stepped side 3023 of one light unit 303 is placed on top of the flat side of another light unit 303 with a gap defined between a wall forming the stepped side 3023 and the distal free end of the flat side of the light unit 303 for easy maintenance access. With the arrangement of the detachably mounted light units 303, dismantle is implemented only to the malfunctioned ones.

A further preferred embodiment of the present invention is shown that the light board 302 has a base 3022 detachably mounted on the installation face 207 of the installation frame 20 and light sources 3021 arranged on top of the base 3022.

The base 3022 is made of heat dissipation material so as to dissipate heat generated from the light sources 3021. The base 3022 is composed of multiple strip-like elements interconnected together. As a result of this arrangement, when the light sources 3021 on one of the strip-like elements are out of order, only the specific one of the strip-like element needs to be replaced and the labor required to replace the entire light board in the current commercially available market is thus unnecessary and saved.

With reference to FIGS. 13 and 14, opposite to the distal end where the installation face 207 is formed, two continuous and adjacent first and second installation grooves 208, 209 are integrally defined in the installation frame 20 for receiving therein the function frame 30. The function frame 30 includes at least a LCD panel 304, a diffusion plate 306 and an optical membrane 308. The LCD panel 304 is inserted into the first installation groove 208 while the optical membrane 208 and the diffusion plate 306 are inserted into the second installation groove 209. Because the installation frame 20 is made of multiple installation strips 201, when the installation 20 is formed completely, the LDC panel 304, the optical membrane 308 and the diffusion plate 306 are properly and securely received in the first and second installation grooves 208, 209. Heat dissipation fins 2012 are formed on either an inner side or an outer side of the installation strips 201. When the heat dissipation fins 2012 are formed on the outer side of the installation strips 201, a cover 50 is provided to prevent pointed edges of the heat dissipation fins 2012 from being damaged or hurting people. The cover 50 may be snap fit to sides of the heat dissipation fins 2012 or secured on the installation frame 20 by way of bolts.

With reference to FIGS. 15 and 16, the second preferred embodiment of the installation strips constructed in accordance with the present invention is provided. In this embodiment, a second installation face 206 is formed on one side of the installation frame 20 for installation of the LCD panel 304. The LCD panel 304 is securely fixed on the installation face 206 through a fixing device 60. The fixing device 60 includes at least a pressing bar and bolts. After one side of the pressing bar securely abuts against one side of the LCD panel 304, bolt(s) are implemented to extend through the other side of the pressing bar and into the installation frame 20 to allow the LCD panel 304 to be securely fixed on the second installation face 206.

In still another preferred embodiment of the present invention, it is appreciated that the second installation face 206 and the second installation groove 209 are integrally formed on one side of each of the installation strips 201 and the installation face 207 is formed on the other side of each of the installation strips 201 for dismantling or installing the light board 302. In the preferred embodiment shown in the accompanying drawings, the light board 302 is detachably mounted on the installation face 207, while the optical membrane 308 and the diffusion plate 306 are inserted into the second installation groove 209. Also, the LCD panel 304 is fixed on the second installation face 206.

it is noted that the advantages provided by the preferred embodiment of the present invention include:

Adopting the installation strips to form the installation frame saves the integral metallic backboard and front frame. In addition, the installation strips can be cut into any length to adapt to different size requirements, which enhances the maneuverability of operation. Therefore, the overall cost for production is reduced and the manufacturer(s) is able to control the cost efficiently.

The light board is detachably mounted on the installation frame so that maintenance and/or repair of the malfunctioned light sources on the light board is readily easy. In addition, the light board is composed of multiple strip like elements, which allows replacement to only the malfunctioned one(s) to be individually processed. The material used for making the light board is a heat dissipation material, which enhances the overall heat dissipation effect of the display module and protects the light source as well.

Heat dissipation fins 2012 are formed on one side of each of the installation strips to thus prolong the lifespan of the display module constructed in accordance with the preferred embodiment of the present invention.

What is claimed is:

1. In a display module having therein an installation frame and multiple function plates securely received inside the installation frame, characterized in that:
   the installation frame composed of multiple installation strips interconnected together and each one of the installation strips being provided with an installation device through which the function plate is secured inside the installation frame;
   the installation frame further comprising a light board which is composed of multiple light units detachably mounted on an installation face which is formed on one distal end of two oppositely located installation strips;
   wherein each of the light units has a stepped side and a flat side oppositely formed relative to the stepped side and detachably placed under the stepped side of an adjacent one of the light unit to form the light board;
   a gap is defined between a wall forming the stepped side of one light unit and a free edge of the flat side of the adjacent one of the light unit to allow easy access to the light board for maintenance;
   each of the installation strips is provide with a heat dissipation device which is composed of multiple heat dissipating fins selectively formed on an inner side or an outer side of each of the installation strips.

2. The display module as claimed in claim 1, wherein the installation frame includes four installation strips and one free end of each of the four installation strips is connected to the other free end of an adjacent one of the installation strips to form the installation frame.

3. The display module as claimed in claim 1, wherein the light board is composed of a base made of a heat dissipation material and light sources arranged on top of the base.

4. The display module as claimed in claim 1, wherein the installation frame has an installation groove defined in an inside of the installation frame to securely receive therein sides of the function plates.

5. The display module as claimed in claim 1, wherein the function plates includes at least a LCD plate and the installation frame is provided with a second installation groove defined therein to receive therein the LCD panel with the assistance of a fixing device.

6. In a display module having therein an installation frame and multiple function plates securely received inside the installation frame, characterized in that:
   the installation frame composed of multiple installation strips interconnected together and each one of the installation strips being provided with an installation device through which the function plate is secured inside the installation frame;
   the installation frame further comprising a light board which is composed of multiple light units detachably mounted on the installation face; and multiple heat dissipating fins being alternatively and selectively formed on an inner side or an outer side of each of the installation strips for dissipating heat.

7. The display module as claimed in claim 6, wherein the installation frame includes four installation strips and one free end of each of the four installation strips is connected to the other free end of an adjacent one of the installation strips to form the installation frame.

8. The display module as claimed in claim 7, wherein the light board is composed of a base made of a heat dissipation material and light sources arranged on top of the base.

9. The display module as claimed in claim 8, wherein the installation frame has an installation groove defined in an inside of the installation frame to securely receive therein sides of the function plate.

10. The display module as claimed in claim 9, wherein the function plate includes at least a LCD plate and the installation frame is provided with a second installation groove defined therein to receive therein the LCD panel with the assistance of a fixing device.

11. In a display module having therein an installation frame and multiple function plates securely received inside the installation frame, characterized in that:
the installation frame composed of multiple installation strips interconnected together and each one of the installation strips being provided with an installation device through which the function plate is secured inside the installation frame;
the installation frame further comprising a light board which is composed of multiple light units detachably mounted on an installation face which is formed on one distal end of two oppositely located installation strips, wherein the other distal end of the two oppositely located installation strips is provided with at least one installation groove to support the function plates; and
multiple heat dissipating fins being alternatively and selectively formed on an inner side or an outer side of the two oppositely located installation strips and sandwiched between the installation face and the at least one installation groove for heat dissipating.

12. The display module as claimed in claim 11, wherein the installation frame includes four installation strips and one free end of each of the four installation strips is connected to the other free end of an adjacent one of the installation strips to form the installation frame.

13. The display module as claimed in claim 12, wherein the light board is composed of a base made of a heat dissipation material and light sources arranged on top of the base.

14. The display module as claimed in claim 13, wherein the function plates include at least a LCD plate and the installation frame is provided with a second installation groove defined therein to receive therein the LCD panel with the assistance of a fixing device.

\* \* \* \* \*